9473X
No Printed Specification Available
N. Lockling,
Smoke Consumer,
Patented Mar. 4, 1836.
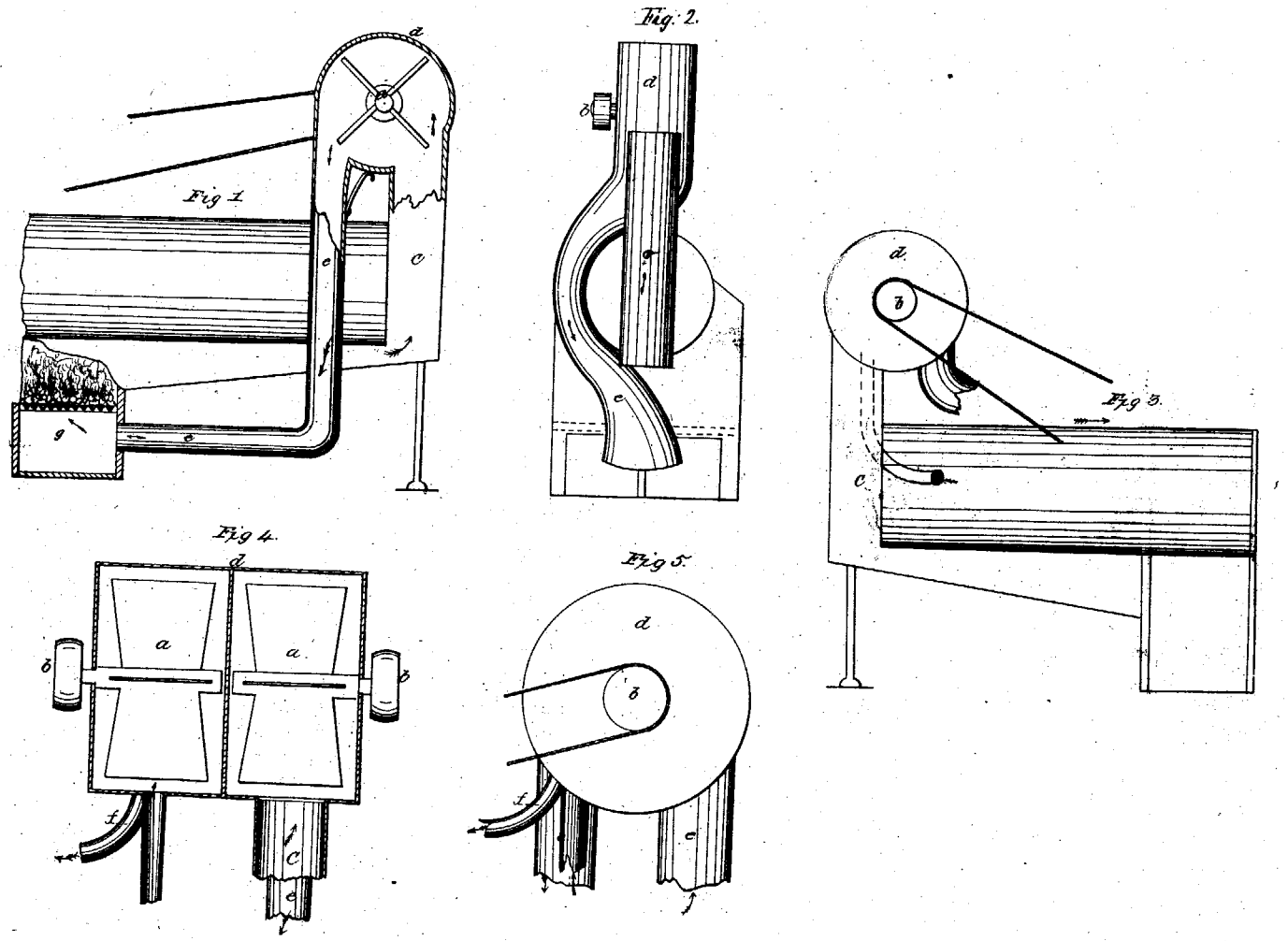

Nathan Lockling. of Sparta. State of New York.

Letters Patent.

The schedule referred to in these Letters Patent and making part of the same, containing a description in the words of the said Nathan Lockling himself of his improvement in the apparatus for consuming smoke and escape steam to be applied to steam Boilers —

To all to whom these presents shall come

Be it known that I Nathan Lockling of Sparta in the County of Livingston and State of New York, have invented a new and useful improvement in the method of blowing for combustion the smoke produced from the fire of an ordinary Steam Engine; and also for conducting the steam from the escape pipe, either separately or together with the smoke, heat, &c from the smoke pipe into the reservoir; thereby producing a great economy of heat.

My invention relates to an improved construction of the apparatus heretofore used for that purpose, the nature of which and the manner wherein the same is to be performed is fully described and explained by the following description. The invention consists of an apparatus affixed to the outlet of either, or both of the pipes, used for the escape of the smoke, or of the steam, so as to produce a strong current of air, by means of a [illegible] [illegible], which I construct by affixing wings to a shaft revolving in a suitable case, taking care that they strike as near the circumference of the case as convenient, and the shaft may be driven by any suitable application from the engine. the first [illegible] it will be necessary to give [illegible]. Beneath one side of the case, is to be formed an opening for the admission of the escape pipe so as that [illegible] [illegible] the current against the [illegible] of the pipe [illegible] [illegible] [illegible] opening on the opposite 3d side, into a tube [illegible] leading to the desired point; which is case that the smoke is to be burnt, and by that bringing it into imme-diate contact with the fuel, so as to be drawn through it. But if the object will be to carry it together with the escape steam, into the reservoir; then of course the escape steam pipe will also open into the rotary bellows, or the smoke pipe. Should it be desired to conduct them to different points, as for instance the smoke through the fire, and the steam into the reservoir, then I use a rotary bellows with an axis sufficiently long to admit of a partition between or a division of the wings, thereby forming two chambers, one intended for the smoke, and the other for the steam. I would have it understood that I do not claim the combustion of the smoke, nor the return of it, and the escape steam, or the escape steam only; but what I do claim is the adaptation of the rotary bellows, according to the manner of construction above set forth as a means of conducting the smoke or steam from the escape pipes thereof to the points already designated in the common steam engine In testimony that the above is a full description of my improvement, I have hereunto set my hand this fifth day of February in the year eighteen hundred and thirty six Witnesses
B. K. Morsell
[illegible] McC[illegible]

Nathan [illegible]

612 [illegible]

[illegible]

[illegible]